July 22, 1969  J. O. LENZ  3,456,556
TRACER APPARATUS
Filed Aug. 7, 1967
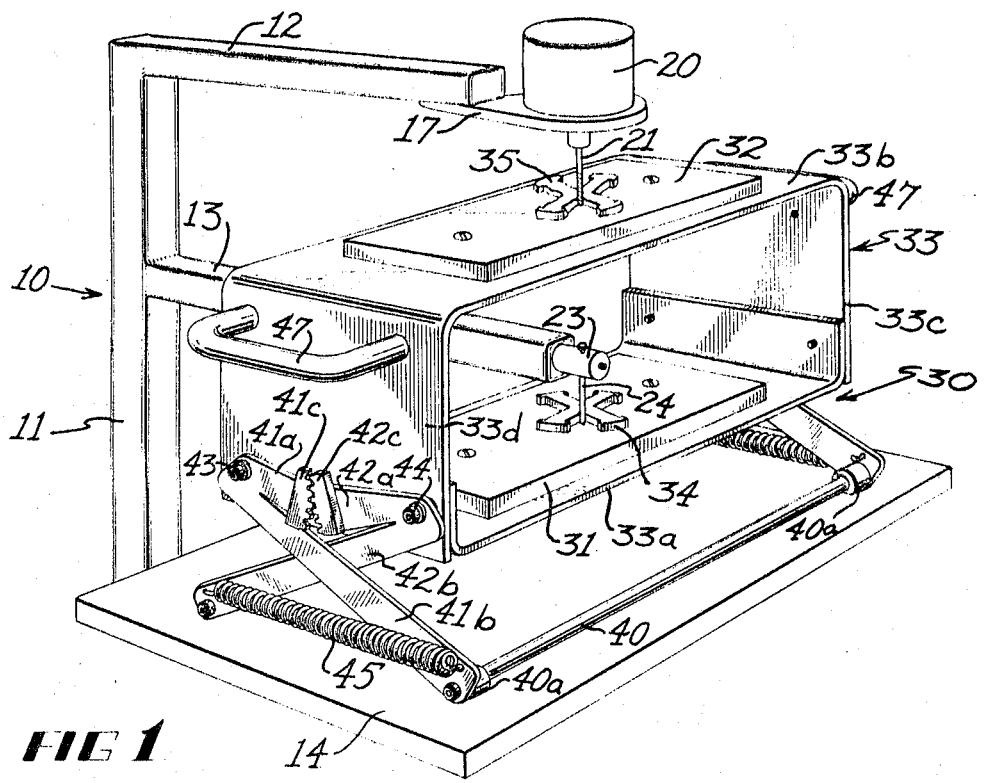
FIG 1
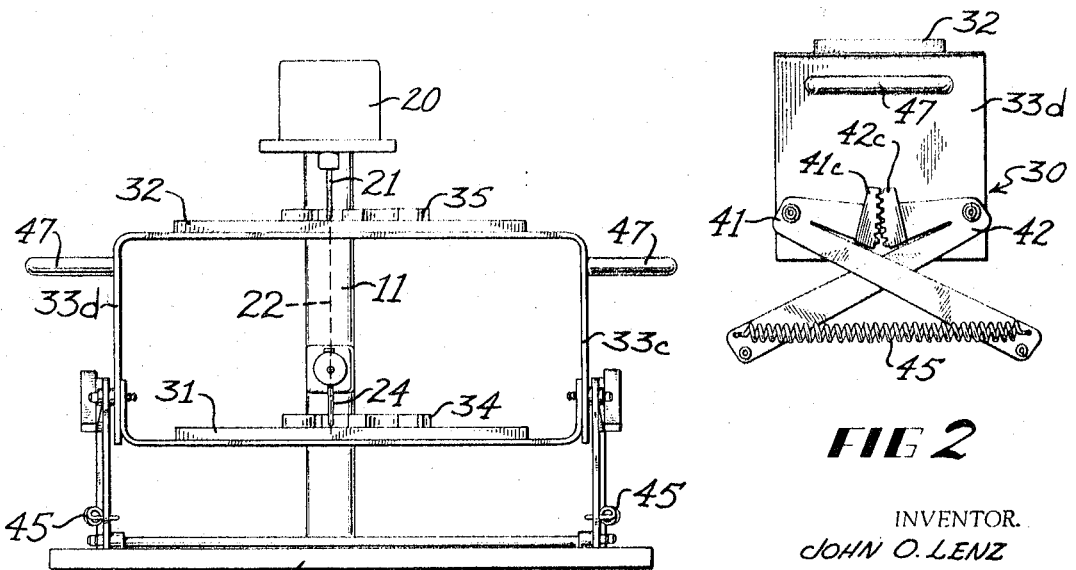
FIG 3
FIG 2
INVENTOR.
JOHN O. LENZ
BY Donald R. Stoetrom
ATTORNEY

United States Patent Office 3,456,556
Patented July 22, 1969

3,456,556
TRACER APPARATUS
John O. Lenz, Coon Rapids, Minn.
(1161 98th Lane NW., Minneapolis, Minn. 55433)
Filed Aug. 7, 1967, Ser. No. 658,752
Int. Cl. B23c 1/16, 1/18; B23d 7/08
U.S. Cl. 90—13.2          10 Claims

ABSTRACT OF THE DISCLOSURE

A tracer apparatus having a fixed, axially aligned, tracer element and tool and a base surface normal thereto, and a movable support member movable on the base surface and having spaced, parallel, pattern and workpiece carrying members and means rendering the pattern and workpiece carrying members movable toward and away from the base surface for cooperation with the tracer element and tool while continuously maintaining the pattern and workpiece carrying members parallel to the base surface.

BACKGROUND OF INVENTION

There are many applications for tracer apparatus of the type wherein copies are made of a three-dimensional pattern. Such apparatus permits the relatively rapid making of good likenesses of the pattern even by a relatively unskilled operator. Many types of tracer apparatus have been proposed in the past. Most of these utilized a fixed pattern and workpiece and a movable tracer element and tool and in general these devices have been quite complex and expensive. Tracer apparatus with a fixed tracer element and tool and movable workpiece and pattern has also been proposed but had the disadvantage of having complex linkage between the pattern and workpiece and of requiring a relatively large space in the plane of the pattern and workpiece. In general, these prior tracer devices have been too complex, too expensive, and too bulky for most home workshops.

BRIEF SUMMARY OF INVENTION

This invention provides a simple and relatively inexpensive tracer apparatus for making copies of a three-dimensional pattern. It provides a tracer apparatus which, although it will also find other uses, is particularly useful in the home workshop. The tracer apparatus is of the type having a fixed tracer element, a tool rotatable about a fixed axis, a fixed base surface and means for simultaneously presenting a pattern to the tracer element and a workpiece to the tool. A fixed support means mounts the tracer element and the tool in fixed, spaced, parallel, relationship with their axes aligned. A movable support member includes a pattern carrying member and a workpiece carrying member and means fixing them in spaced, parallel, relationship. The movable support member further includes means rendering the pattern and workpiece carrying members movable in two dimensions along the base surface and further means rendering the pattern and workpiece carrying members movable in a third dimension generally normal to the aforesaid two dimensions and maintaining the pattern and workpiece carrying members substantially parallel to the base surface in all of their positions along the third dimension.

The invention lies in the unique movable support member per se and in the combination thereof with the tool, tracer element, fixed support member and base surface.

DESCRIPTION OF DRAWING

FIGURE 1 is a perspective view of a tracer apparatus constructed according to this invention; FIGURE 2 is an end view of a movable support member which forms a part of the invention; and FIGURE 3 is a front elevational view of the tracer apparatus of FIGURE 1.

DETAILED DESCRIPTION OF INVENTION

Referring to the drawing, the numeral 10 designates a fixed support means including a vertical post 11 and a pair of support arms 12 and 13 rigidly attached thereto and extending horizontally therefrom. Arms 12 and 13 are disposed in spaced, parallel, relationship with arm 12 directly above arm 13. Post 11 is fixed with respect to a member 14, providing a planar base surface, by appropriate means such as a plate 15 which is welded or otherwise rigidly attached to the post and secured to member 14 by screws 16. Post 11 extends perpendicular to the base surface and arms 12 and 13 are parallel thereto and spaced therefrom so that arm 13 lies between arm 12 and the base surface. Post 11 may extend downward to a base or support, not shown. The free end of arm 12 carries a mounting member 17 for a motor driven rotary tool such as a router or the like. The tool has been shown by way of example as including a motor 20 driving a tool 21 which extends downwardly below arm 12 and is rotatable about a vertical axis 22. The free end of arm 13 carries a mounting member 23 for a tracer element 24 which extends vertically downward below arm 13 and is vertically aligned with tool 21 so that axis 22 is common to both the tool and the tracer element.

Cooperable with the fixed support means 10 and the base surface of member 14 is a movable support means 30. The movable support means includes a flat pattern carrying member 31 and a similar flat workpiece carrying member 32. Members 31 and 32 are mounted in spaced, parallel, relationship on a rectangular box-like member 33 which has spaced, parallel, sides 33a and 33b on which members 31 and 32, respectively, are mounted, and parallel ends 33c and 33d connecting sides 33a and 33b. Member 33 is constructed so that members 31 and 32 are spaced a distance substantially equal to the distance between the ends of vertically aligned tool 21 and tracer element 24. A pattern 34 is mounted on member 31 and a workpiece 35, on which the shape of the pattern is to be duplicated, is mounted on member 32 in substantial vertical alignment with the pattern. The pattern and workpiece may be attached to their respective carrying members by any convenient means such as by a double-faced adhesive tape.

If desired, the pattern and workpiece may be mounted directly on sides 33a and 33b, respectively, of member 33 so that these sides constitute pattern and workpiece carrying members, respectively, and ends 33c and 33d constitute means maintaining them in spaced, parallel, relationship. In the preferred form, members 31 and 32 are formed from a relatively soft material such as composition board or the like and member 33 from a harder material, preferably a metal. Thus, the use of members 31 and 32 lessens the likelihood of damaging the tool and tracer element.

Movable support means 30 also includes a base portion slidable along the surface of member 14. This base portion may comprise, for example, a pair of spaced, parallel, rod or tube members 40, each having an enlarged cylindrical member 40a at each end and providing a sliding surface for engagement with the planar surface of member 14. Only one member 40 is visible in the drawing but it will be understood that the other is identical. It should also be understood that rollers or some other type of anti-friction device may be utilized between the base portion and the base surface if desired but it is only essential that the base portion be freely movable in two dimensions along the base surface.

The movable support means further includes means mounting the pattern and workpiece carrying members 31 and 32 (through member 33) on the base portion, rendering the pattern and workpiece carrying members movable as a unit in a third dimension normal to the base surface, and continuously maintaining them parallel to the base surface. This last means includes, for example, identical parallel linkages on each end of member 33. Each linkage includes two identical links 41 and 42. Link 41 includes a short leg 41a and a long leg 41b making a small angle therewith and is pivoted at the point where these two legs join, about a pivot 43 fixed on the lower portion of end 33d of member 3 and adjacent one edge thereof. The free end of leg 41a carries a gear sector 41c and the free end of leg 41b is rigidly connected to member 40a on rod 40. Leg 42 is identical but reversed and includes a short leg 42a, a long leg 42b, and a gear sector 42c. The end of leg 42b is rigidly connected to member 40a on the other of the members 40. Leg 42 is pivoted adjacent the opposite edge of end 33d about a pivot 44.

Legs 41 and 42 are constructed and arranged so that gear sectors 41c and 42c mesh and legs 41b and 42b cross slightly below member 33a. As can be seen in FIGURE 3, members 41 and 42 are slightly deformed so that legs 41a and 42a lie substantially in a single plane while leg 42b lies slightly behind leg 41b. A spring 45 connects the free ends of legs 41b and 42b and urges them together so that the pattern and workpiece carrying members are resiliently urged upward away from the base surface. A pair of handles 46 and 47 are mounted on ends 33c and 33d, respectively.

As indicated, tool 21 and tracer element 24 are vertically aligned as are pattern 34 and workpiece 35. The operator grasps handles 46 and 47 and guides movable support means 30 so that pattern 34 is moved about tracer element 24 moving support means 30 in all three dimensions as necessary. Pattern and workpiece carrying members 31 and 32 are continuously maintained parallel to each other and parallel to the base surface. Therefore, pattern 34 and workpiece 35 are simultaneously presented to tracer element 24 and tool 21, respectively, and the pattern is duplicated on the workpiece.

The apparatus described is particularly suited for the home workshop because it is simple, compact and relatively inexpensive. It can be utilized successfully by an unskilled person. With some experience, the operator may manipulate movable support member 30 to give a particular finish, such as a hand-carved appearance, to the workpiece. Various modifications may be apparent in view of the disclosure herein. Therefore, the invention is to be limited solely by the scope of the appended claims.

The embodiments of the invention in which an exclusive property or right is claimed are defined as follows:

1. Tracer apparatus of the type having a fixed tracer element, a tool rotatable about a fixed longitudinal axis, a fixed planar base surface, and means for simultaneously presenting a pattern to the tracer element and a workpiece to the tool, the tracer element also having a longitudinal axis, the apparatus comprising: fixed support means mounting the tracer element and the tool in fixed, spaced, parallel, relationship with respect to each other and with respect to the base surface and with their longitudinal axes in substantial alignment; a pattern carrying member; a workpiece carrying member; movable support means including first means fixing said pattern carrying member and said workpiece carrying member in spaced, parallel, relationship; said movable support means further including second means rendering said pattern carrying member and said workpiece carrying member movable in two dimensions generally parallel to the base surface; and said movable support means further including third means rendering said pattern and workpiece carrying members movable in a third dimension generally normal to said two dimensions and maintaining said pattern and workpiece carrying members substantially parallel to the base surface in all positions of said pattern and workpiece carrying members.

2. The apparatus of claim 1 wherein said third dimension of movement of said pattern carrying member and said workpiece carrying member is substantially parallel to the axes of said tracer element and said tool.

3. The tracer apparatus of claim 2 wherein said pattern and workpiece carrying members each include generally flat planar surfaces adapted to have a pattern and a workpiece, respectively, rigidly mounted thereon for simultaneous presentation to the tracer and tool, respectively.

4. The tracer apparatus of claim 3 wherein the pattern and workpiece carrying members are spaced a distance substantially equal to the distance between the tracer element and the tool.

5. The tracer apparatus of claim 2 wherein said second means includes a base portion on said movable support means readily movable along the fixed base surface and having said pattern and workpiece carrying members carried thereby and movable in said two dimensions therewith.

6. The tracer apparatus of claim 5 wherein said third means includes linkage means mounting said pattern and workpiece carrying members on said base portion and maintaining said members substantially parallel to said base surface.

7. A movable support member for use with a tracer apparatus having a tracer element and a rotary tool fixed in spaced, axially aligned, relationship generally normal to a planar base surface, the movable support member comprising: a base portion adapted to be disposed on the planar base surface and constructed to be readily movable in two dimensions therealong; a pattern carrying member adapted to have a pattern fixedly mounted thereon for presentation to the tracer member; a workpiece carrying member adapted to have a workpiece fixedly mounted thereon for presentation to the tool; means fixing said pattern carrying member and said workpiece carrying member in spaced, generally parallel, relationshrip; means mounting said pattern and workpiece carrying members on said base portion and rendering them movable therewith in said two dimensions; and the last named means including linkage means rendering said pattern and said workpiece carrying members movable as a unit in a third dimension toward and away from said base portion and continuously maintaining said pattern and said workpiece carrying members substantially parallel to the surface on which said base portion is disposed.

8. The movable support member of claim 7 further including yieldable means resiliently urging said pattern and workpiece carrying members in said third dimension away from said base portion.

9. The movable support member of claim 8 including a pair of oppositely disposed handles on the means connecting said pattern and workpiece carrying members and adapted to be grasped by the hands of a human operator and thereby manipulate the movable support member in said two dimensions and said third dimension with respect to the tracer element and the tool.

10. The movable support member of claim 7 wherein the pattern and workpiece carrying members are spaced a distance substantially equal to the distance between the tracer element and tool.

References Cited

UNITED STATES PATENTS 905,669  12/1908  Drexler _____ 90—13.2
2,539,311  1/1951  Mathieu _____ 90—58

GERALD A. DOST, Primary Examiner

U.S. Cl. X.R.

90—58